UNITED STATES PATENT OFFICE.

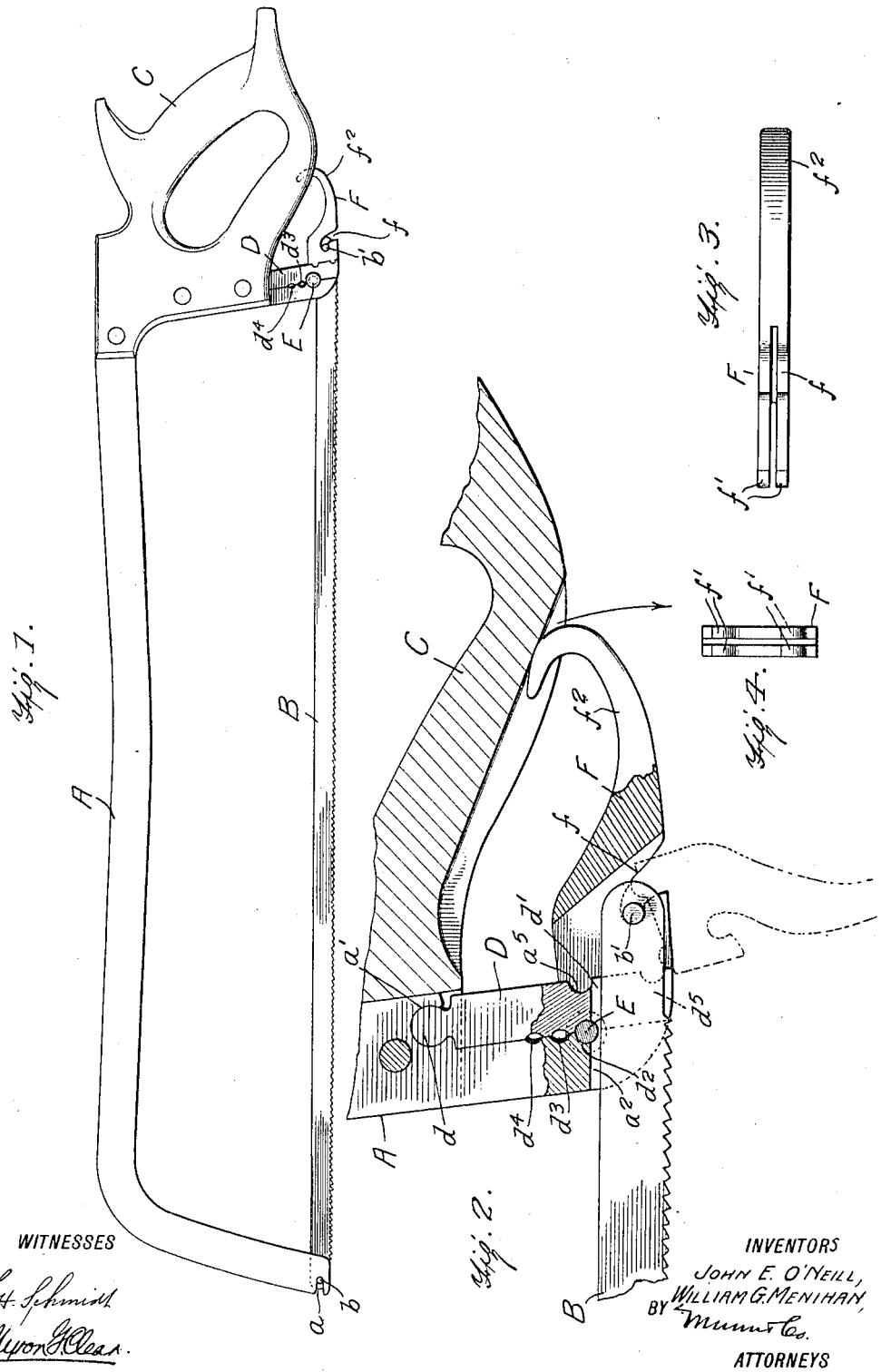

JOHN E. O'NEILL AND WILLIAM G. MENIHAN, OF CORNING, NEW YORK.

SAW.

1,080,365. Specification of Letters Patent. Patented Dec. 2, 1913.

Application filed April 29, 1913. Serial No. 764,336.

*To all whom it may concern:*

Be it known that we, JOHN E. O'NEILL and WILLIAM G. MENIHAN, citizens of the United States, and residents of Corning, in the county of Steuben and State of New York of the United States of America, have made a new and useful Improvement in Saws, of which the following is a specification.

Our present invention relates to saws and particularly to butchers' saws, our object being to provide this character of saw with means whereby a removable blade may be readily and quickly attached and detached, our object being further to provide such means as will obviate the necessity for the use of any extra tools and which will promote a simple, durable and inexpensive structure.

The means by which we accomplish the above objects are shown in the accompanying drawing, in which—

Figure 1 is a side elevation of our improved saw, Fig. 2 is a detailed enlarged section through the lower portion of the handle end of the saw. Fig. 3 is a bottom plan view of the blade lever removed, and, Fig. 4 is an inner end elevation of the same.

Referring now to these figures, A indicates the usual form of saw frame, the toe end of which is bifurcated to form a seat for the similar end of the blade B and is further provided with slots or recesses $a$ extending therein from the outer surface thereof and in which transversely extending pins $b$ of the blade are adapted to engage. The opposite or heel end of the frame A, to which the saw handle C is secured, is cut away upon its outer surface below the said handle C and provided adjacent this cut out portion with a circular recess $a'$, this recess receiving the similarly shaped end $d$ of a head piece D extending along the outer surface of the heel of the frame and in the cut out portion thereof, the outer ends of the frame heel and head piece being bifurcated as indicated at $a^2$ and $d'$ respectively in order to provide seats therethrough for the heel end of the saw blade.

The head piece D being movable with respect to the heel end of the saw blade, by virtue of the before mentioned connection between these parts at $d$, the inner contiguous side edges thereof are provided with pairs of recesses $d^2$, $d^3$ and $d^4$, of varying depths, these recesses being adapted to inclose a transverse spacing pin E, the outer ends of which are headed and which is adapted for engagement between selected pairs of the recesses in order to adjustably position or space the head piece D with respect to the heel of the frame A. The outer side edge of the head piece D is substantially broad and flat with the exception of a pair of semicircular recesses $d^5$, these recesses being adapted to receive the similarly spaced and shaped projections $f'$ of one end of the blade lever F. This end of the blade lever F is substantially broad and flat and is bifurcated to receive the heel of the saw blade B, which has oppositely projecting pins B' engageable within curved side slots $f$ of the lever, the opposite end of this lever being curved upwardly and inwardly below the handle C to provide a handle portion $F^2$. Thus it will be seen with the spacing pin E disposed in the recesses $d^2$ as shown in Figs. 1 and 2, the head piece D and the heel of the frame will be in contact. Should it be desired to increase the tension of the saw blade B, the lever F may be pulled downwardly as indicated by the arrow in Fig. 2 and released, thus effecting a quick detachment of the saw blade in order that the operator may move the head piece D with respect to the saw frame and permit spacing pin E to be positioned within the recesses $d^3$, or within the recesses $d^4$ if a decidedly increased tension of the saw blade is desired. With the pin E in the recesses $d^3$ however, the head piece D will be spaced but slightly from the heel of the frame so that when the blade lever F is again forced to the position shown in Fig. 2, the blade B will be drawn taut as desired.

It will be noted that by the particular construction we employ, the head piece D has bearing along its entire inner side against the heel of the frame and is therefore rigidly and permanently supported along its entire inner edge except when spaced from the heel of the frame by the pin E and is then supported through this pin. It will be further noted that the engagement between the blade lever and the head piece is accomplished through the means of relatively broad and substantially flat surfaces which are unbroken except for the relatively engaging projections and recesses necessary for the prevention of accidental displacement of the lever. It will be further seen that the attachment and detachment of the saw blade may be readily and quickly accomplished without the necessity for the use of separate tools and that when the blade is secured in place there will be no slack inasmuch as the draft is substantially parallel with the point of support.

We claim:—

1. The combination of a saw frame having the outer side of one end thereof cut away, an adjustable head piece disposed in the space in the saw frame thus formed, the outer extremities of the frame end and the end of the head piece being bifurcated to form blade seats and the contiguous edges of these parts being provided with pairs of opposing recesses of varying depths, a member adapted for placement in selected recesses whereby to selectively position the head piece with respect to the frame end, the outer edge of said head piece having recesses, a blade lever having a handle at one end and having its opposite end bifurcated and terminating in a relatively broad and substantially flat surface provided with projections for engagement in the last mentioned recesses of the head piece, said lever being also provided with curved side slots, and a blade having its end extended into the bifurcated end of the lever and provided with oppositely projecting pins engaged within the side slots thereof.

2. The combination of a saw frame having the outer side of its heel end cut away, an adjustable head piece in the space in the saw frame thus formed, the contiguous edges of the said frame and head piece being provided with pairs of opposing recesses of varying depths, a member adapted for placement in selected recesses whereby to selectively position the head piece with respect to the frame, a blade lever having a handle at one end and a curved side slot and having its opposite end terminating in a relatively broad and substantially flat surface adapted for bearing upon the outer side edge of the head piece, relatively engaging means carried by the said head piece and the said lever to prevent accidental displacement of the latter, and a blade having projecting pins for engagement in the side slot of the lever.

3. The combination of a saw frame, an adjustable head piece disposed along the outer side of the heel end of the frame and bearing against the same, the contiguous inner edges of the frame head and head piece being provided with pairs of recesses of varying depths, a spacing pin adapted for engaging within selected pairs of the recesses whereby to selectively position the head piece with respect to the frame, a blade lever having a handle at one end and having its opposite end terminating in a relatively broad, flat surface adapted for bearing upon the outer side edge of the head piece, and a blade detachably connected to the said lever, all for the purpose described.

4. The combination of a saw frame, an adjustable head piece disposed against the outer surface of the heel end of the frame and having bearing thereon, and a pivotal connection at one end therewith, the contiguous edges of said frame, and said head piece having opposing series of recesses, a spacing member adjustable between the frame and the head piece toward and away from the pivot of the head piece and seated in opposing recesses, whereby to adjustably position the head piece with respect to the frame, a blade lever for bearing at one end against the outer surface of the head piece, and a blade having removable connection with the blade lever, all for the purpose described.

JOHN E. O'NEILL.
WILLIAM G. MENIHAN.

Witnesses:
JAMES O. SEBRING,
JUSTIN V. PURCELL.